United States Patent
Prette

[11] 3,844,663
[45] Oct. 29, 1974

[54] PIVOTAL CONNECTION WITHOUT CLEARANCE, ESPECIALLY FOR MEASURING INSTRUMENTS

[75] Inventor: Mario Prette, Segrate, Italy

[73] Assignee: Semel S.p.A., Milan, Italy

[22] Filed: Feb. 16, 1973

[21] Appl. No.: 333,375

[30] Foreign Application Priority Data
Feb. 19, 1972 Italy.................................. 20782/72

[52] U.S. Cl.................. 403/157, 403/161, 403/220, 403/291, 308/2 A, 267/154, 64/15 B, 64/27 L
[51] Int. Cl. ........................................... F16c 11/12
[58] Field of Search........... 308/2 A; 64/15 B, 15 R, 64/27 B, 27 L; 267/57, 154, 160; 403/203, 220, 291, 157, 158, 79, 161

[56] References Cited
UNITED STATES PATENTS

| | | | |
|---|---|---|---|
| 2,800,948 | 7/1957 | Omon et al. .......................... | 403/79 |
| 2,819,892 | 1/1958 | Huff.................................... | 308/2 A |
| 2,860,495 | 11/1958 | Stark................................... | 64/15 B |
| 3,081,991 | 3/1963 | Swainson............................. | 64/27 B |
| 3,272,492 | 9/1966 | Jones................................... | 267/154 |

Primary Examiner—Jordan Franklin
Assistant Examiner—Conrad L. Berman
Attorney, Agent, or Firm—Cushman, Darby & Cushman

[57] ABSTRACT

A pivotal connection without clearance is disclosed, which comprises at least two cores aligned along the pivotal axis and connected by resilient tongues extending on planes passing through the pivotal axis, the cores being rendered solid with said members in an alternate sequence. A central pin through the cores provides for maximum axial rigidity while not interfering with torsional elasticity.

5 Claims, 3 Drawing Figures

PATENTED OCT 29 1974 3,844,663

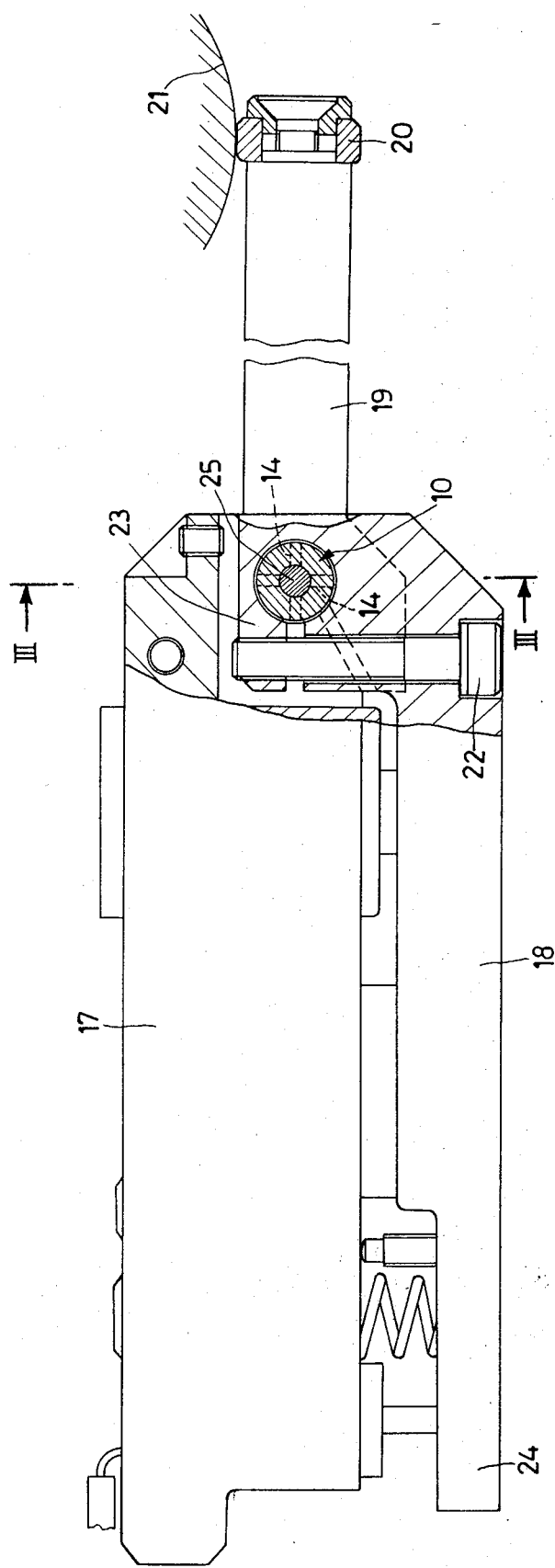

PIVOTAL CONNECTION WITHOUT CLEARANCE, ESPECIALLY FOR MEASURING INSTRUMENTS

This invention relates to a pivotal connection between component parts which are required to effect limited angular swinging motions with respect to each other.

In the free connections, clearances are present of necessity and they can be confined within a very narrow range only at the expenses of an extremely accurate and costly mechanical machining.

The clearances at the assembly as outlined above are extremely detrimental in correspondence with the linkages of measuring instruments, since they have a negative bearing on their accuracy and sensitivity. On the other hand, the manufacture of linkages, for example of the hinge type, with too narrow allowances can give rise to an interference between the sliding component parts so that parasitic forces are originated, whose magnitude can be evaluated only with difficulty, also because they are variable in time as a function of wear and lubrication.

An object of the present invention is to provide a pivotal connection between component parts which oscillate with respect to each other, said connection being virtually deprived of clearances and having a resistance to twist which can be evaluated and which is constant. By so doing, the above indicated drawbacks, which are inherent in the conventional connections, can be done away with.

The pivotal connection between two members is characterized according to the invention in that it comprises at least two cores aligned along a pivotal axis and connected to one another by tongues which extend on planes passing through said pivotal axis.

According to a preferred embodiment the device comprises three aligned cores: the central one of which is connected to the lateral ones by tongues, the central core being intended to bear one of said members, the lateral cores being intended to bear the other of said members.

The device according to the invention will be described in more detail hereinafter in connection with an exemplary embodiment, in order that its features and objects may be more clearly understood. This embodiment is shown in the accompanying drawings, wherein:

FIG. 2 shows a view, partly in cross-section, of a measuring apparatus known per se, to which the device shown in FIG. 1 has been applied.

Figure 1:
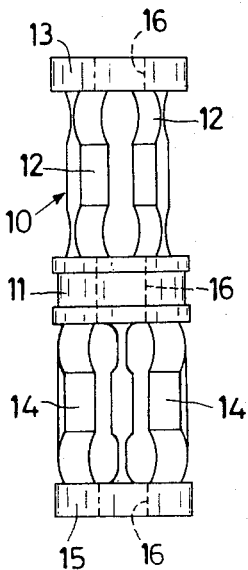
FIG. 1 shows a side view of the device according to the invention.
Figure 3:
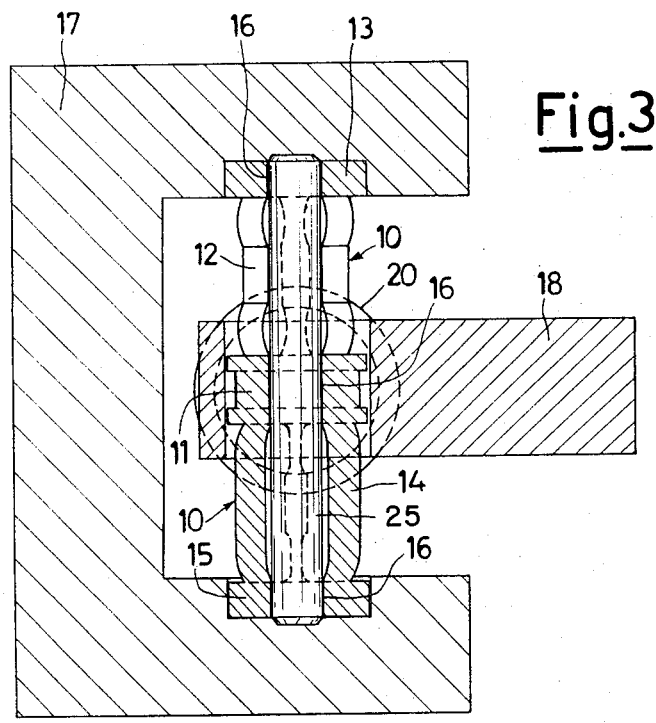
FIG. 3 is a cross-sectional view taken along the line III—III of FIG. 2.

As shown in FIG. 1, the pivotal connection indicated generally at 10, is composed by a central cylindrical core 11, from a side of which branch off wings 12 which connect it to the side core 13. At the other side the core 11 carries wings 14 connected to the core 15.

As shown in the drawings, the cores 11, 12 and 15 have a through bore 16 which is a through bore due to the limited extension of the wings 12 and 14 towards the center.

The assemblage of the device 10 is shown in FIG. 2, where it is incorporated in a measuring instrument comprising a fixed body 17 on which can oscillate a lever 18 carrying an arm 19, the latter being terminated by a feeler 20 resting on an object 21 to be measured and shown only in part. It is apparent that a variation of the size of the object 21 gives rise to a rotation of the lever 18 as supported for rotation by the device 10. The lever 18 itself is rigidly connected to the central core 11 by clamping with the aid of the screw 22 which is screwed in the lever jaw 23.

Similar clamping means, not shown, retain on the fixed body 17 the two lateral cores 13 and 15. A stiffening pin 25 is introduced in the bore 16 with a reduced clearance.

Feelers of an appropriate kind are contained in the body 17 to emit a signal which is proportional to the displacement of the end 24 of the lever 18. These details have not been shown since they are not a part of the invention and are well known to those skilled in the art.

It is now clear that the lever 18 is moved relatively to the body 17 by bending and twisting of the wings 12 and 14 of the device 10, made of a material which is sufficiently resilient to overcome without yielding the deformations originated by the limited rotation of the lever.

It should be noticed that the wings 12 and 14 are pulled and compressed by forces acting on the lever in a direction which is perpendicular to the action of the object 21 and thus they have a very high stiffness. Staggering the wings 12 relative to the wings 14 acts in such a way that at least one pair of wings is in a position very close to the positioning on a plane containing a force directed perpendicularly to the plane containing the lever, that is, a plane perpendicular to the pivotal axis which corresponds to the axis of the bore 16.

The pin 25 is an additional safety measure against accidental high stresses tending to twist the device 10 and is not loaded, conversely, under normal conditions in the rotational movements of the core 11 about the natural pivotal axis.

The device 10 has proven to be very suitable for providing a pivotal connection without clearance, with a reaction force which can be accurately evaluated and is substantially elastic in rotation. It is apparent that an appropriate correction in the calibration of the instrument will easily allow for said reaction force.

It should be noted that the device as shown can be varied withon a wide range without departing from the scope of the present invention; more particularly, the shape and the arrangement and the number of the wings will be dependent upon what is most appropriate considering the amplitude of the required rotations and the forces which are active.

More particularly, the shape of the wings shown in the accompanying drawings has proved to be an advantageous, but wings having the central portion enlarged with respect to the areas close to the cores are suitable also.

Of course, the cores may be shaped in the manner which is the most appropriate for engaging the bodies on which they are mounted.

What I claim is:

1. A pivotal connection for effecting limited swinging between a first member and a second member, said connection comprising
   a. a central core adapted to be rigidly connected to said first member, b. two side cores, one on each side of said central core, said side cores both being adapted to be rigidly connected to said second member, and said central core and said two side cores having bores which are axially aligned along a pivotal axis;

c. at least two elastic tongues connecting each of said side cores to said central core, said tongues twisting in response to radial rotational movement between said central core and said side cores about said pivot axis, and d. means for preventing relative axial movement between said side cores and for limiting the radial movement of said tongues during twisting thereof, said means including a stiffening pin passing through the bores of said central and side cores, said pin being spaced from said tongues and from said central core during normal operation of said connection but abutting said tongues to limit the inward radial movement thereof when said tongues are twisted more than a given amount.

2. A pivotal connection as recited in claim 1 wherein said tongues connecting one of said side cores to said central core are angularly spaced from said tongues connecting said other one of said side cores to said central core.

3. A pivotal connection as recited in claim 1 wherein each of said tongues extends in a plane passing through said pivotal axis of said connection.

4. A pivotal connection as recited in claim 3 wherein each of said tongues has a substantially rectangular cross-section, the major dimension of said rectangular cross-section being radially disposed with respect to said pivotal axis.

5. A pivotal connection as recited in claim 1 wherein the cross-sectional area of each of said tongues is smaller at the ends of said tongue near said cores than is the cross-sectional area of said tongue near the middle thereof.

* * * * *

UNITED STATES PATENT OFFICE
CERTIFICATE OF CORRECTION

Patent No. 3,844,663                    Dated  October 29, 1974

Inventor(s)   MARIO PRETTE

It is certified that error appears in the above-identified patent and that said Letters Patent are hereby corrected as shown below:

In the patent heading the Assignee and its address should be listed as follows:

--SEMEL S.p.A. TREZZO SULL'ADDA, Milan, Italy --

Signed and sealed this 13th day of March 1975.

(SEAL)
Attest:

RUTH C. MASON
Attesting Officer

C. MARSHALL DANN
Commissioner of Patents
and Trademarks